United States Patent [19]

Esser

[11] Patent Number: 4,708,176

[45] Date of Patent: Nov. 24, 1987

[54] RISER FOR DRAWING OFF LIQUIDS

[76] Inventor: Gerhard Esser, Am Herzleiterbach 8, D-5330 Königswinter 41, Fed. Rep. of Germany

[21] Appl. No.: 679,403

[22] Filed: Dec. 7, 1984

[30] Foreign Application Priority Data

Dec. 7, 1983 [DE] Fed. Rep. of Germany ....... 3344182

[51] Int. Cl.[4] .............................................. G05D 7/01

[52] U.S. Cl. .................................. 141/65; 137/170.1; 137/519; 138/45

[58] Field of Search ..................... 137/170.1, 497, 504, 137/12.5, 519; 251/122, 903; 138/44, 45, 40; 141/65, 285

[56] References Cited

U.S. PATENT DOCUMENTS

| | | | |
|---|---|---|---|
| 1,825,378 | 9/1931 | Wilson | 251/367 |
| 2,190,634 | 2/1940 | Leone et al. | 138/44 X |
| 2,312,067 | 2/1943 | Bates . | |
| 2,726,841 | 12/1955 | Crist | 137/170.1 X |
| 2,742,057 | 4/1956 | Krieck | 137/497 X |
| 2,988,346 | 6/1961 | Sciore | 137/504 X |
| 3,137,326 | 6/1964 | Welty et al. | 137/170.1 X |
| 3,164,141 | 1/1965 | Jones | 137/519 X |
| 3,311,131 | 3/1967 | Zahuranec | 138/44 |
| 3,990,611 | 11/1976 | Sojka . | |
| 4,095,727 | 1/1978 | Dorsch . | |
| 4,234,018 | 11/1980 | Herrington | 138/45 |
| 4,611,786 | 9/1986 | Jorgensen et al. | 138/44 X |

FOREIGN PATENT DOCUMENTS

| | | | |
|---|---|---|---|
| 504765 | 3/1931 | Fed. Rep. of Germany . | |
| 7323295 | 6/1973 | Fed. Rep. of Germany . | |
| 2926221 | 1/1981 | Fed. Rep. of Germany . | |
| 180031 | 12/1936 | Switzerland . | |
| 20841 | of 1908 | United Kingdom | 138/45 |
| 109199 | 9/1917 | United Kingdom | 137/504 |
| 888477 | 1/1962 | United Kingdom . | |
| 1196587 | 7/1970 | United Kingdom . | |
| 1402854 | 8/1975 | United Kingdom . | |
| 509967 | 8/1979 | United Kingdom . | |
| 2066426 | 7/1981 | United Kingdom . | |

*Primary Examiner*—Martin P. Schwadron
*Assistant Examiner*—Stephen M. Hepperle
*Attorney, Agent, or Firm*—Bernard, Rothwell & Brown

[57] ABSTRACT

The riser is used for the substantially foamfree drawing of gaseous liquids, preferably liquids containing carbon dioxide, or gasfree liquids from gas-pressurized receptacles. The riser is equipped with an entry chamber, a downstream reduction chamber connected to it and a reduction pin movable in both chambers. Preferably a calming chamber of widened cross-section is formed in rising direction behind the reduction chamber. The riser enables gasfree and gaseous liquids, in particular beverages containing carbon dioxide, to be drawn from receptacles independently of the gas pressure inside them, substantially without causing the liquid to foam. The riser, in connection with a receptacle closure fitting, may with ease be changed from one receptacle to another.

8 Claims, 6 Drawing Figures

RISER FOR DRAWING OFF LIQUIDS

Figure 1:
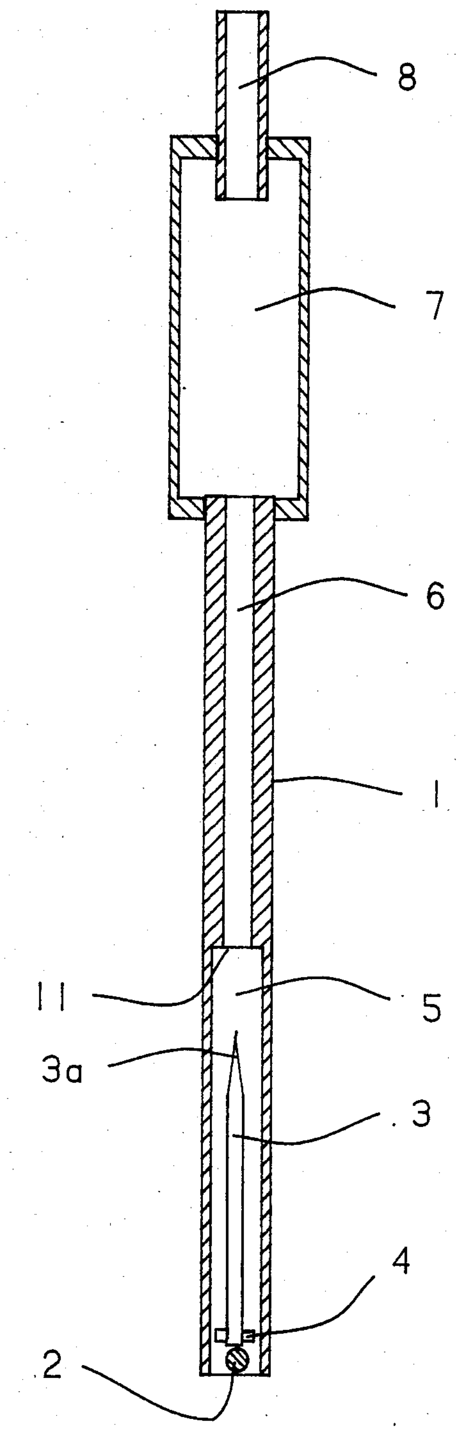

The invention relates to a riser for the substantially foamfree drawing of gaseous liquids, preferably liquids containing carbon-dioxide, or gas-free liquids from lightly or even heavily pressurized receptacles.

Risers in receptacles are known. The known designs are mostly of constant diameter. If pressure in the receptacle, for instance a bottle, is at a high, uncontrolled level, the speed of the liquid flowing through the riser is considerably increased. With gaseous liquids, in particular beverages containing carbon dioxide for instance, this leads to undesirable foaming of the liquid flowing and leaving the receptacle through the riser.

The invention is based on the need to produce a riser which avoids the known disadvantages and, independently from the pressure in the receptacle, enables gas free and also gaseous liquids, in particular liquids containing carbon dioxide, to be drawn from receptacles substantially without foaming of the liquid. In particular, it is desirable that the design lay-out shall be such, that the riser, in conjunction with a corresponding receptacle closure fitting, may with ease be changed from one receptacle to another. Further requirements and advantages are revealed in the description below.

According to this invention I provide a riser for the substantially foamfree drawing of gaseous liquids, preferably liquids containing carbon-dioxide, or gas free liquids from pressurised receptacles, the riser having an entry chamber, a downstream reduction chamber connected therewith and a reduction pin movable in both chambers. The reduction pin resting in the entry chamber of the riser rises in the pipe once the liquid has reached a certain flow speed, in order to reduce the free flow diameter in the reduction chamber and to raise the flow resistance. When the liquid thus enters the riser at an excessive flow speed, which in the riser or a fitting connected with it would lead to foaming of the liquid, the reduction pin is pushed into the reduction chamber reducing the flow speed in this chamber to a point, whree foaming does no longer occur and allowing the liquid to reach the closure fitting of the receptacle without any loss of gas.

According to the preferred embodiment the reduction chamber has a smaller cross section than the entry chamber, and the reduction pin, in turn, has a smaller corss-section than the reduction chamber. Insofar as the reduction pin is in the wider entry chamber, no substantial reduction in flow speed takes place in there. But insofar as the reduction pin protrudes into the reduction chamber, the flow speed is throttled in the annular gap thus formed. The width of the annular gap may be 0.25 mm for instance. The degree to which the flow speed is reduced depends upon the width of the gap, i.e. upon the ratio between the reduction pin diameter and the reduction chamber diameter and, if required, the diameter ratio in further throttling stages of the riser. By nature the reduction will also depend upon the length of the annular gap, i.e. the throttling point. The weight of the reduction pin may be used for determining the flow speed at which the pin is carried into the reduction chamber thereby slowing the flow speed down.

A calming chamber of widened cross-section is preferably provided in the riser downstream of the reduction chamber. In this chamber the liquid is allowed to calm down in order to reach the receptacle closure fitting through the outlet pipe in a foamfree and slowly flowing state.

Whilst the reduction pin and the reduction chamber are frequently of approximately equal length, it is possible, in a special embodiment, for the reduction pin to extend from the reduction chamber through the calming chamber to the end of the riser. In this case the flow of the liquid is slowed down by the annular gap existing for all speeds.

In a further embodiment of the invention two or several risers may be sequentially arranged in flow direction. With very high pressures in the receptacle (e.g. up to 10 bar overpressure) this embodiment is suitable for reducing the speed of the liquid to the point required for preventing foaming.

According to the preferred embodiment of the invention, the reduction pin in the entry chamber is movable between a lowermost position, in which it rests by its weight on a support surface, and an uppermost position, in which it is held by the flow pressure of the rising liquid. At small flow speeds, when the liquid does not tend to foam, the reduction pin is in the rest position, in which there is no or only minor throttling of the flow. But from a certain flow speed upwards the reduction pin is carried into its uppermost position by the flow pressure. It is then, at least partially, in the reduction chamber resulting in a corresponding throttling of the flow speed. The support surface of the reduction pin may be formed by a pin or a cross-section narrowing at the entry of the entry chamber.

Preferably the diametrical dimension of the reduction pin is larger at its lower end than the entry of the reduction chamber so that, as the reduction pin rises, its lower end is prevented from entering the reduction chamber, thus determining the uppermost position of the reduction pin. With one embodiment the diametrical dimension of the reduction pin at its lower end may be enlarged in that for instance two outward-pointing pegs are provided transversely to the reduction pin axis, which in the uppermost position of the reduction pin rest against the narrowing at the entry to the reduction chamber. These transversely protruding pegs also enable the reduction pin to support itself, in its lowermost position, against the support surface, if this is formed by a cross-section narrowing for instance.

At the transition from the reduction chamber into the calming chamber a short pipe socket is conveniently provided which serves to avoid turbulence at the transition from one to the other chamber, since this can generate bubbles resulting in foam formation.

Furthermore the reduction pin in the preferred embodiment is flattened at the lower leading end and pointed at the uppermost trailing end. This flow-effective design of the reduction pin ensures that the flow passes the pin without creating turbulence thus avoiding the formation of bubbles and foam. It also ensures automatic centering of the reduction pin in the reduction chamber.

Figure 2:
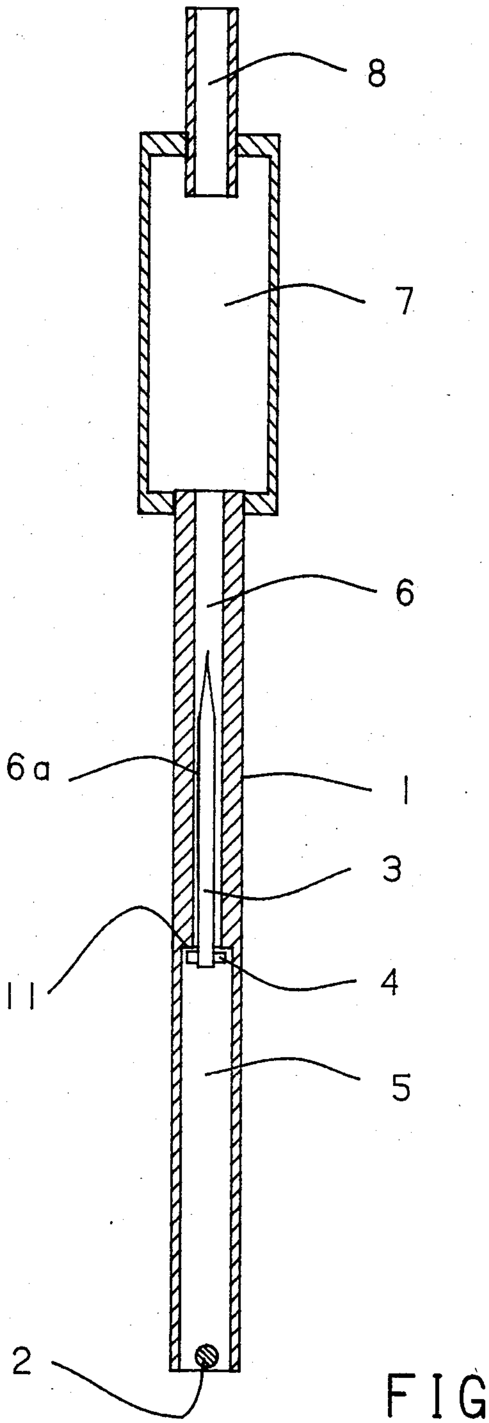
Figure 3:
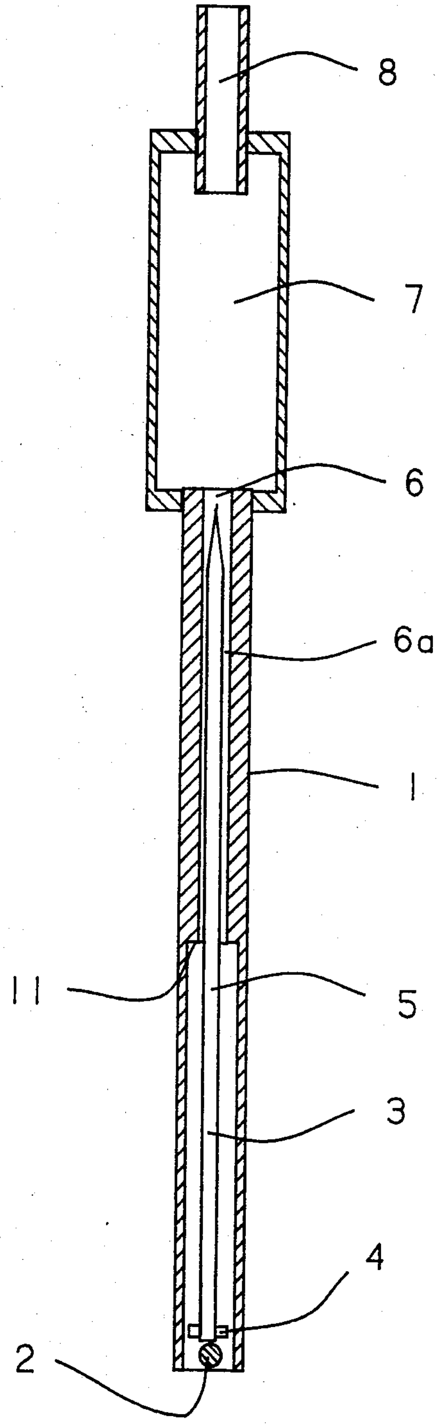
Figure 4:
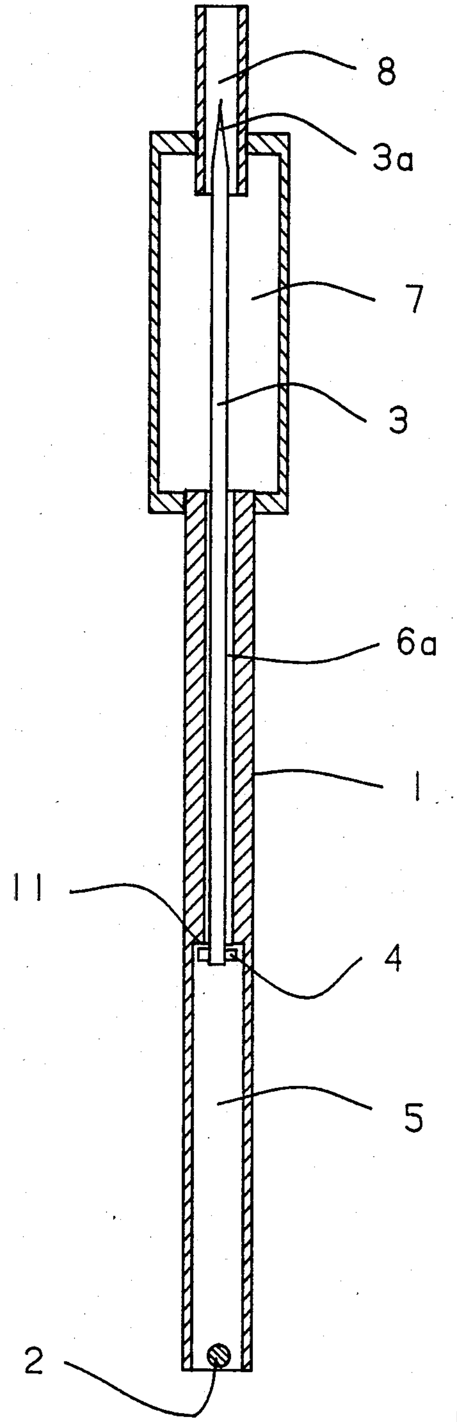
Figure 6:
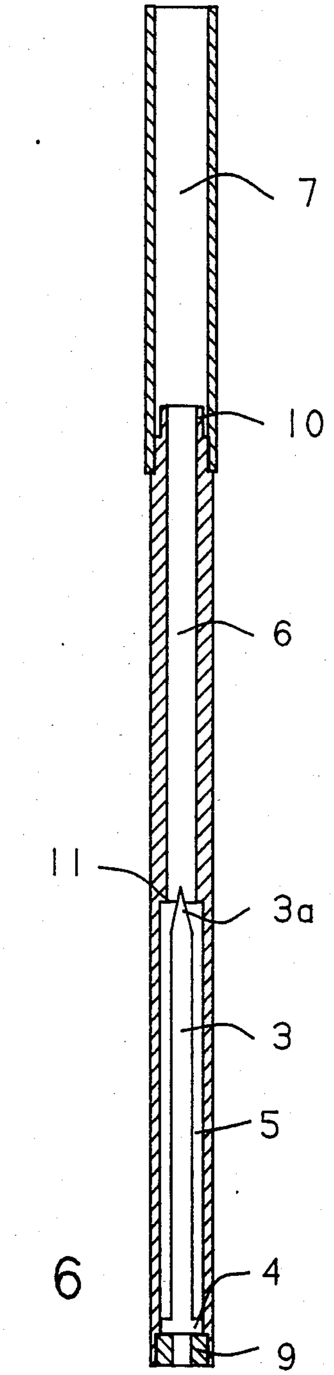
Figure 5:
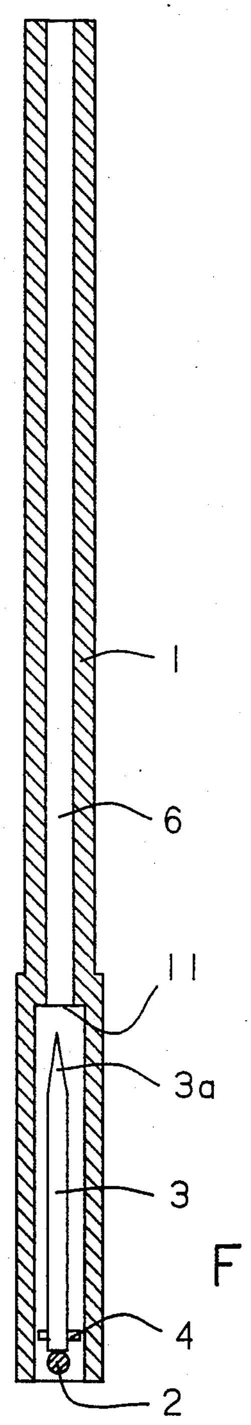

The invention will now be described in detail with reference to the drawing illustrating several embodiments of the riser, with FIG. 1 showing a longitudinal section of a first embodiment of the riser with its reduction pin in the rest position;

FIG. 2 showing a longitudinal section as per FIG. 1, but with the reduction pin in the uppermost position;

FIG. 3 showing a longitudinal section of a second embodiment of the riser with a long reduction pin in the rest position;

FIG. 4 showing a longitudinal section as per FIG. 3 with the reduction pin in the uppermost position;

FIG. 5 showing a longitudinal section of a third embodiment of the risers according to the invention; and FIG. 6 showing a longitudinal section of a fourth embodiment of the riser according to the invention.

With the embodiment illustrated in FIGS. 1 and 2 the riser 1 essentially consists of three sections, i.e. a lower entry chamber 5, a central reduction chamber 6 and an upper calming chamber 7. At the lower end of the entry chamber 5 a securing pin 2 is arranged, on which rest a vertically movable reduction pin 3, as long as the flow speed of the liquid in pipe 1 does not exceed a certain limit value. At its lower end the reduction pin 3 carries two arresting pegs 4 radially protruding from the pin 3, whilst the upper end of the pin 3 is formed into a point $3^a$. The three chambers 5–7 are cylindrically shaped in the embodiment illustrated with the cross-section of the reduction chamber 6 being smaller than the cross-section of the entry chamber 5, so that at the transition from the entry chamber 5 to the reduction chamber 6 a circular-shaped step 11 is formed. The cross-section of the calming chamber 7 is substantially larger than the cross-section of the reduction chamber 6. At the upper end of the calming chamber 7 outlet pipe 8 is arranged, which with its lower end protrudes into the calming chamber 7.

When the flow speed of the liquid in pipe 1 exceeds a certain limit value, reduction pin 3 in the entry chamber 5 is lifted and carried into reduction chamber 6, until the arresting pegs 4 touch step 11 and reduction pin 3 thus reaches its uppermost position, which is illustrated in FIG. 2. In this position of pin 3 an annular gap $6^a$ is formed in reduction chamber 6. The rising liquid must pass this annular gap, whereby its flow speed is decreased considerably. The slowed-down liquid then reaches calming chamber 7. Here it calms down and can leave through the outlet pipe 8 without foaming.

As the internal pressure in the receptacle, into which pipe 1 protrudes, drops during the emptying process due to lowering of the liquid level in the receptacle, the flow speed in the entry chamber 5 will slow down. When the flow speed drops below the limit value mentioned, the dynamic pressure acting upon pin 3 is no longer sufficient to hold it at step 11. Thereupon the reduction pin 3 will sink back to the lower position illustrated in FIG. 1.

The embodiment illustrated in FIGS. 3 and 4 is different from the embodiment shown in FIG. 1 and 2 only as regards the length of the reduction pin 3. With the reduction pin 3 in the lower position as illustrated in FIG. 3 the cross-section of both the entry chamber 5 and the reduction chamber 6 is reduced. Therefore even small flow speeds of the liquids are throttled immediately. As the flow speed increases the reduction pin 3 is carried into the upper position illustrated in FIG. 4, in which the cross-sections of the reduction chamber 6, the calming chamber 7 and also the outlet pipe 8 are reduced. This kind of cross-section reduction leads to very small flow speeds at the exit of the outlet pipe 8 even if internal pressure inside the receptacle is high, e.g. more than 1 bar overpressure. As the flow speed in the entry chamber decreases the reduction pin 3 will sink back to the position illustrated in FIG. 3.

The embodiment of the riser illustrated in FIG. 5 is different from the embodiments as per FIGS. 1 to 4 mainly in that a long reduction chamber 6 of constant cross-section, but no widened calming chamber 7 is provided. In this case reduction chamber 6 leads directly into the receptacle closure fitting (not shown) connected to it.

With the embodiment as per FIG. 6 a ring 9 has been inserted into the opening of entry chamber 5, the inner diameter of which is smaller than the cross-section of the entry chamber as such, so that reduction pin 3 can support itself with its arresting pegs 4 against the ring 9. Reduction chamber 6 in this embodiment is extended by a short pipe socket 10 protruding into the calming chamber 7. Due to this arrangement the risk of turbulence and thus of degassing and foam formation is reduced at the transition from the reduction chamber 6 to the calming chamber 7.

With a typical embodiment the cylindrical reduction chamber 6 has a length of 70 mm and a diameter of 4 mm. The length of the reduction pin 3 is also 70 mm, its diameter in the cylindrical area 3.5 mm, the length of point $3^a$ 10 mm and the length of its flattened rear part 20 mm.

The riser according to the invention is suitable for drawing gaseous liquids for example from pressurised receptacles, in particular for drawing beverages containing carbon dioxide, from bottles, small barrels and other beverage receptacles. At its upper end the riser carries a closure fitting with a shut-off valve, which is screwed on to the receptacle, so that the riser extends almost to the bottom of the receptacle. In the gas space of the receptacle the released gas generates a pressure which is utilised as driving pressure for the liquid. When the shut-off valve of the closure fitting is opened, the liquid flows into entry chamber 5 at a speed dependent upon the receptacle pressure. The flow speed is reduced either from lower values onwards (FIG. 3) or not until higher values are reached (FIG. 1), enabling the liquid to flow out through the closure fitting without foaming.

The riser according to the invention is suitable, in particular, for drawing off beverages containing carbon dioxide, such as cola drinks, lemonades, mineral waters and sparkling wines from larger bottles and other receptacles, which are emptied in portions over a longer period of time. This avoids releasing the pressure in the receptacle for each opening of it in order to draw a portion of the beverage and allowing the beverage to lose too much carbon dioxide and thus to deteriorate in its flavour. However, the invention is not limited to applications in the drinks industry. The riser may be used everywhere, where it is important that gaseous, low-gas or gas free liquids have to be drawn from a pressurised receptacle at a reduced and/or controlled flow speed.

What is claimed is:

1. A vertical riser for substantially foam-free drawing of a liquid containing a gas, which tends to cause foaming at atmospheric pressure when subjected to a velocity greater than a predetermined velocity from a pressurized receptacle; the riser comprising:

- a vertically elongated lower entry chamber for receiving the gas-containing liquid from the receptacle;
- a vertically elongated reduction chamber of constant cross-section extending upward from the entry chamber;

an elongated reduction pin contained substantially within said entry chamber at low receptacle pressures which produce liquid flow velocities through the chambers less than the predetermined velocity, and movable from said entry chamber to substantially within said reduction chamber at high receptacle pressure which can produce, in the absence of said pin, a liquid flow velocity through the chambers equal to or greater than the predetermined velocity;

said entry chamber having a horizontal cross-section larger than the cross-section of said reduction chamber for forming with said pin, when in a lowered position, a first annular passage having a cross-section sufficiently large to permit flow of liquid through the chambers at said predetermined velocity during said high receptacle pressures;

said reduction chamber and said reduction pin having horizontal cross-sections and lengths for forming, when said reduction pin is positioned within said reduction chamber, a second annular passage having a constant cross-section extending for a length designed to restrict the velocity of liquid flow therethrough to less than said predetermined velocity; and said pin having a weight less than the upward forces thereon from liquid flow during said high receptacle pressures.

2. A riser according to claim 1 further comprising a calming chamber of widened cross-section in rising direction above the reduction chamber.

3. A riser according to claim 11 wherein the reduction pin is movable in the entry chamber between a lowermost position, in which it rests by its weight on a support surface and an uppermost position, in which it is held by the flow pressure of the rising liquid.

4. A riser according to claim 3, wherein the support surface is formed by a pin at the entry to the entry chamber.

5. A riser according to claim 3, wherein the support surface is formed by a cross-section narrowing at the entry of the entry chamber.

6. A riser according to claim 3, wherein the diametrical dimension of the reduction pin is larger at its lower end than the entry to the reduction chamber, so that when the reduction pin rises its lower end it is prevented from entering the reduction chamber thus determinig the uppermost position of the reduction pin.

7. A riser according to claim 2, wherein at the transition from the reduction chamber to the calming chamber a short pipe socket is formed.

8. A riser according to claim 1, wherein the reduction pin is flattened at the lower leading end and pointed at the upper trailing end.

* * * * *